US012319630B2

(12) United States Patent
Vanorio

(10) Patent No.: US 12,319,630 B2
(45) Date of Patent: Jun. 3, 2025

(54) PHLEGO CEMENT FROM A NEW EARTH-INSPIRED CLINKER

(71) Applicant: The Board of Trustees of the Leland Stanford Junior University, Stanford, CA (US)

(72) Inventor: Tiziana Vanorio, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 554 days.

(21) Appl. No.: 17/781,864

(22) PCT Filed: Dec. 4, 2020

(86) PCT No.: PCT/US2020/063448
§ 371 (c)(1),
(2) Date: Jun. 2, 2022

(87) PCT Pub. No.: WO2021/113737
PCT Pub. Date: Jun. 10, 2021

(65) Prior Publication Data
US 2023/0013411 A1  Jan. 19, 2023

Related U.S. Application Data

(60) Provisional application No. 62/944,990, filed on Dec. 6, 2019.

(51) Int. Cl.
| | |
|---|---|
| *C04B 7/43* | (2006.01) |
| *C04B 7/51* | (2006.01) |
| C04B 7/36 | (2006.01) |
| C04B 12/00 | (2006.01) |
| C04B 28/00 | (2006.01) |
| C04B 28/18 | (2006.01) |
| C04B 111/00 | (2006.01) |

(52) U.S. Cl.
CPC ............. *C04B 7/43* (2013.01); *C04B 7/51* (2013.01); *C04B 7/367* (2013.01); *C04B 12/005* (2013.01); *C04B 28/006* (2013.01); *C04B 28/18* (2013.01); *C04B 2111/00017* (2013.01); *Y02P 40/10* (2015.11); *Y02P 40/18* (2015.11)

(58) Field of Classification Search
CPC .. C04B 7/43; C04B 7/51; C04B 7/367; C04B 12/005; C04B 28/006; C04B 28/18; C04B 2111/00017; Y02P 40/10; Y02P 40/18
See application file for complete search history.

(56) References Cited

FOREIGN PATENT DOCUMENTS

CN    105502973 A    *    4/2016

OTHER PUBLICATIONS

CN-105502973-A, machine translation (Year: 2016).*
Jacoby, "Alternative materials could shrink concrete's giant carbon footprint", 2020, Inorganic chemistry v98n45.
Bettenhausen, "Cemex goes global with carbon-neutral concrete", 2020, Materials v98n42.
Yang et al., "Reactive Magnesium Oxide Products: Carbon Neutral Cement for the Future?", 2018, The Concrete NZ conference.

* cited by examiner

*Primary Examiner* — Anthony J Green
*Assistant Examiner* — Marites A Guino-O Uzzle
(74) *Attorney, Agent, or Firm* — LUMEN PATENT FIRM

(57) ABSTRACT

Improved cement for concrete is provided having reduced carbon footprint and improved mechanical properties. A limestone-free process of making the clinker provides a 70% reduction of carbon footprint vs. conventional manufacture of Portland cement. Curing the resulting cement in a temperature range from 80° C. to 100° C. advantageously enhances growth of fibrous minerals in the concrete.

3 Claims, 4 Drawing Sheets

|  | Leucitophyre[1] | Raw Meal | Pozzolanic Ash[2] |
|---|---|---|---|
| $SiO_2$ | 46.1 | 47.8 | 55.5 |
| $TiO_2$ | 0.8 | 0.9 | 0.8 |
| $Al_2O_3$ | 17.8 | 16.1 | 18.2 |
| $Fe_2O_3$ | 8.1 | 6.2 | 6.1 |
| MnO | 0.2 | 0.1 | 0.1 |
| MgO | 5.7 | 5.6 | 2 |
| CaO | 11.5 | 12.5 | 5 |
| $Na_2O$ | 1.9 | 2.7 | 3.1 |
| $K_2O$ | 6.2 | 6 | 8 |
| $P_2O_5$ | 0.5 | 0.7 | 0.5 |
| BaO | 0.1 | 0.2 | 0.1 |
| SrO | 0.1 | 0.1 | 0.1 |
| $SO_3$ | 0.8 | 0.8 | 0.2 |

[1] The term Leucitophyre describes igneous rocks from subduction regions of potassium-rich volcanism, ranging from *tephrites* and *leucitites* to *phonotephrites*.
[2] Alkaline Pozzolanic Ash

FIG. 2

PHLEGO CEMENT FROM A NEW EARTH-INSPIRED CLINKER

FIELD OF THE INVENTION

This invention relates to methods of making cement that have reduced carbon footprint.

BACKGROUND

High-energy and chemical processes are the main cause of greenhouse gas emissions, which in the case of concrete is cement production. Cement manufacture accounts for 8% of the world's $CO_2$ emissions, contributing both directly (~70% of the emissions) when limestone and clay-rich rocks needed for Portland-cement clinker are thermally decomposed through calcination and indirectly (~30%) through the use of energy, particularly from the combustion of fossil fuels. Every year, ~1300 Mt/year of $CO_2$ are emitted worldwide as a result of the calcination reaction and its energy use. If we consider that a typical vehicle emits about 4.6 tons of carbon dioxide per year, the reduction of ~70% of $CO_2$ emissions through the use of a newly engineered clinker is equivalent to taking 75% of the cars present in US off the road.

Importantly, focusing attention on $CO_2$ emissions alone is not sufficient for sustainable development. Estimates above do not include the lifetime of concrete, which for modern concrete can begin degrading in as little as 10 years, setting an overall life span of 50-100 years. Studies in the literature highlighted the importance of including major factors, namely strength, serviceability and durability when assessing life-cycle impact of concrete. Therefore, it is crucial to minimize the carbon footprint of the materials technology and, at the same time, push the boundaries of materials serviceability in the context of extremes in temperature, stress and stress variations, chemical environments, and their complex interactions.

SUMMARY

The focus of this work is the engineering of a low to near-to-zero greenhouse gas emission cement clinker through the use of an alternative raw material, which substitutes for lime and which exhibits no carbon footprint. The final output is the design and testing of a crossbred mortar structure, from the nanoscale building blocks to the macroscopic constituents, that exhibits the best properties of two worlds—Roman marine concrete (FIG. 1A) and a concrete-like rock created by Nature (FIG. 1B). These properties include expanded durability, physico-chemical resilience and serviceability in harsh environments, namely temperature, stress variations, and acid fluids. Most importantly, the alternative raw material allows for reductions of 70% of $CO_2$ emissions (FIG. 3).

The new lime-producing rocks are igneous rather than sedimentary rocks—the rock category to which carbonate rocks, namely limestones and dolostones, belong. As with carbonates, these igneous rocks contain calcium oxide (CaO, quicklime) as part of their mineral composition. However, such a composition lacks the carbonate ion ($CO_3^-$), which is responsible for the release of $CO_2$ upon calcination.

The advantages and improvements over existing clinkers are manifold:

First, the new "lime" derived from this igneous rock is itself hydraulic.

Second, its production contributes to a reduction of $CO_2$ emissions. The key idea behind the use of this alternative raw material is that the production of cement does not rely on carbon upcycling but rather on the direct reduction of carbon emission from the "upstream" of the manufacturing process. The pyroprocessing of this alternative raw material leads to no carbon footprint from the reaction, which reduces the emissions of $CO_2$ from current calcination by ~70%. Current technology aiming to abate $CO_2$ emissions from cement manufacturing relies heavily on carbon upcycling, namely carbon capture and sequestration (CCS)—that is, capturing waste carbon dioxide from industrial activities to induce cementation, and a potentially carbon-neutral, concrete. However, $CO_2$ mineral sequestration through carbon curing reaction has three shortcomings. First, it generates alkaline wastewater, which must be disposed of. Second, it forms carbonate minerals within the cured concrete, which are unstable and subject to chemical weathering. That raises questions about the long-term stability and serviceability of the $CO_2$ cured concrete. Third, exploitation of this technology is hindered by the high costs for building new cement plants.

Third, the hydraulic clinker produces fibers of calcium-sulfo-aluminate hydrates. When slaked and dispersed within the pozzolanic ash it forms clusters of fibers, which then constitute functional and structural units of the cement.

Fourth, the hydraulic clinker produces geopolymers. When slaked, the presence of alkali oxides ($Na_2O$ and $K_2O$), CaO and $Al_2O_3$ in the clinker leads to the formation of geopolymers, which serve the purpose of enhancing the interfacial bonding between the fibers and the matrix. Geopolymers exhibit excellent mechanical and physical properties—from high compressive strength, thermal stability, to resistance to acid fluids.

In summary, due to its naturally-blended composition the slaking of this new clinker promotes a crossbred structure made of natural growth of fibrous minerals of C-S-A-H and geopolymers. When the clinker is mixed with ash of natural origin or industrial byproducts, such as volcanic or fly ashes, it forms C-A-S-H. Clusters of fibers are embedded in a crossbred mortar and create a mortar that is naturally reinforced. The crossbred nature of the mortar, both fibrous and polymeric, has the real potential of providing exceptional physico-chemical properties—from high compressive strength, thermal stability, to resistance to acid fluids. We also expect alkali-silica reaction (ASR) to be minimized because of the lack of free and amorphous silica in the raw meal.

BRIEF DESCRIPTION OF THE DRAWINGS

FIG. 2 is a table showing exemplary compositions for this work.

DETAILED DESCRIPTION

A) Decarbonizing Cement Manufacturing

Decarbonizing cement manufacturing is not a trivial task. The fraction of Portland cement being responsible for the emissions (i.e., the CaO from limestones) is also responsible for the formation of the glue of Portland cement (the calcium-silicate hydrates, C-S-H). Therefore, the task requires substituting that fraction with something that promotes the formation of different cementitious phases. The greener glue must also ensure durability and serviceability.

Current technologies are focusing on alternative processes and/or materials—from capturing $CO_2$ from calcination for its use in concrete curing technology, to the production of alternative cement blends, to the use of alternative raw materials that promote different cementitious phases.

Curing carbonation relies on carbon upcycling, and is an accelerated curing process into vessels that capture waste carbon dioxide from calcination, injects supercritical (i.e., Temperature=$31°$ C. and Pressure=72.8 atm) $CO_2$ into fresh concrete, and traps the $CO_2$ by mineralizing it into calcite ($CaCO_3$). While the technology induces the cementation of a concrete that is potentially carbon-neutral, it has shortcomings: it is limited to precast concrete products and forms carbonate minerals. These minerals are notoriously brittle and subject to chemical weathering. Furthermore, the exploitation of this technology is also hindered by the high costs for adapting cement plants to needs.

Alternative cement blends substitute a fraction of Portland cement (the source of CaO) with a source of Si and Al, namely alumino-silicate materials. The alumino-silicate material can either be an industrial byproduct, cheaper fly ash and slag coming, respectively, from coal-burning plants and steel production, or a raw material of natural origin, namely volcanic ash or metakaolin. Since the amount of CaO content in the Portland clinker strongly controls compressive strength, cementation is induced by adding alkaline solutions to promote the activation of different cementitious phases (e.g., sodium-alumino-silicate hydrates, N-A-S-H). Challenges range from costs to operational safety concerns associated with the causticity of the chemical additives. Furthermore, with coal plants being retired and steel production declining, fly ash and slag are not as plentiful as they once were.

The alternative raw material presented here is solid and naturally contains both alkaline earth oxides (CaO and MgO) and alkali metals oxides ($Na_2O$ and $K_2O$)

B) Examples of Prior Art Cementitious Microstructures

Figure 1A:
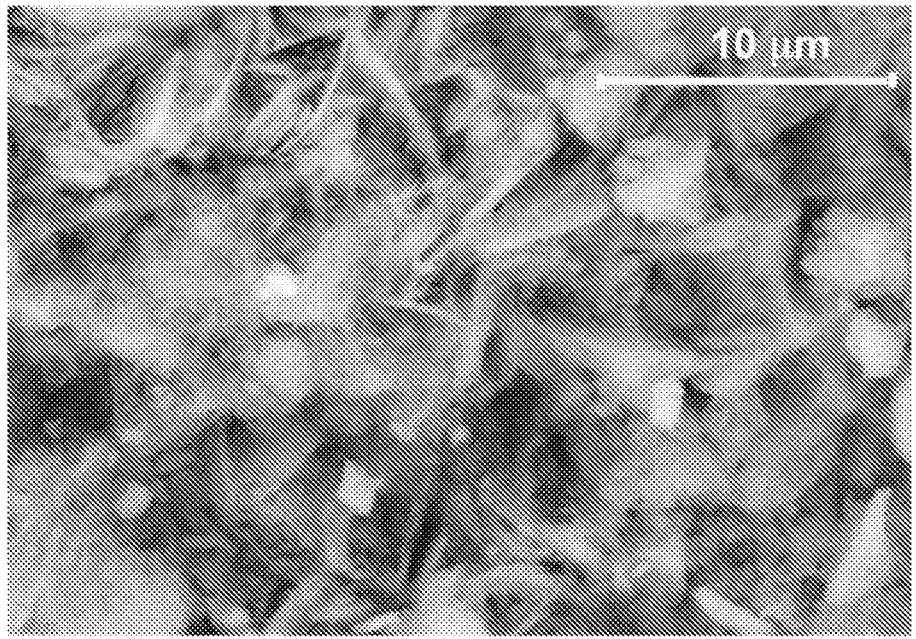
FIGS. 1A-B are SEM images of exemplary prior cementitious microstructures.
Figure 1B:
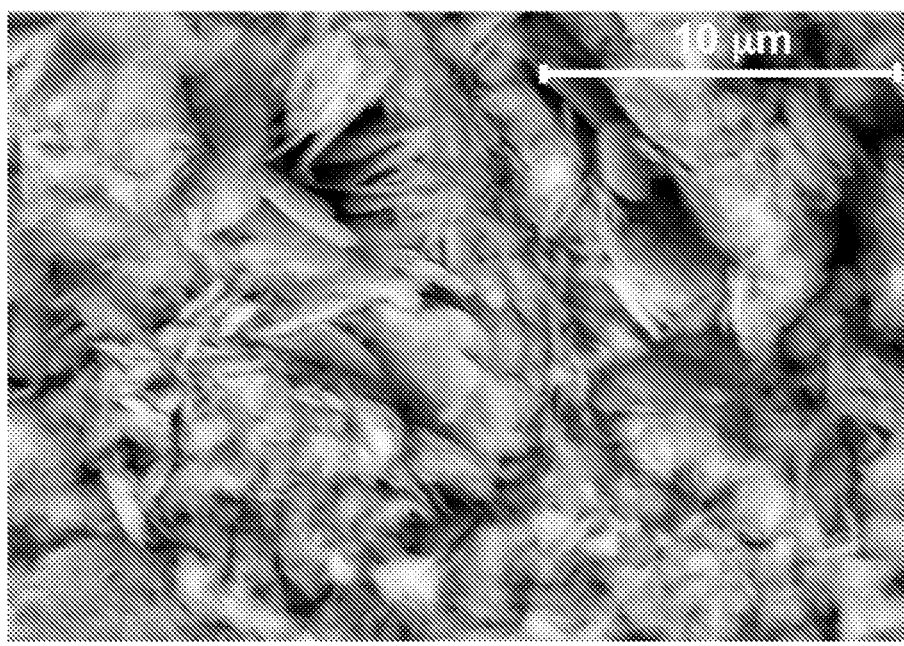

FIGS. 1A and 1B are scanning electron microscope images of Roman marine concrete (MacFarlane et al., 2020) and the concrete-like rock from a caldera (Vanorio and Kanitpanyacharoen, 2015). Both microstructures show the micro-fibrous nature of the cementitious microstructure.

C) Exemplary Clinker Composition of this Work

An exemplary set of compositions for this work is given in the table of FIG. 2. Here the Leucitophyre column is composition of the input rock (i.e., the igneous alternative to limestone and clay), the raw meal column is composition of the input material for clinker pyroprocessing, and the pozzolanic ash column is the composition of the ash to be mixed with the clinker and slaked to provide the phlego cement.

The overall process flow is:
1) grind up the input rock to provide the raw meal,
2) fire the raw meal to provide the clinker (E.g., a firing temperature in the range 900-1200 C for a residence time of 60 minutes, similar to the process used to fire conventional raw meal to provide conventional clinker),
3) the user then slakes the clinker,
4) the user then makes a mixture of the slaked clinker and pozzolanic ash and cures to form a mortar with desirable properties as described above.

The raw meal contains minerals that lack the carbon- or carbonate-ions. As such, the clinker process is carbon neutral. The raw meal can contain both alkaline earth metal (i.e., magnesium, calcium, strontium, and barium) oxides and alkali metal oxides (i.e., sodium and potassium oxides). Once mixed with pozzolanic ash, the clinker provides a hybrid CASH-geopolymer cement—the Phlego cement, that is expected to have superior mechanical properties and serviceability.

Furthermore, these rock types exhibit a naturally-blended composition leading to a clinker that has the ability to create a crossbred mortar made of:
(1) natural mineral fibers of ettringite (C-S-A-H, a calcium-sulfo-aluminate hydrates),
(2) C-A-S-H phases (calcium-alumino-silicate hydrates) that are present in modern Al-rich pozzolanic cements, and
(3) geopolymers.

Current cement clinkers ensure the presence of some of these phases through the addition of additives.

The igneous rock is called Leucite-Tephrite or Tephrite-Basanite (or alternatively, Foid-Monzodiorite/Monzogabbro). These terms refer to rocks all sharing the same elemental composition. Differences simply lie in the type of microstructure and level of crystallinity of the rock. This type of igneous rocks is ubiquitous in Nature, and is found in both active and ancient ultra-potassic or calc-alkaline magmatism above subduction margins.

The composition of this new raw meal is made of:
(a) silica (40% to 60% by weight);
(b) aluminum oxide (10% to 25% by weight);
(c) Sulfur oxide (0.5% to 2% by weight), which together with the presence of CaO and $Al_2O_3$, has the capability of forming fibrous ettringite (C-S-A-H, calcium-sulfo-aluminate hydrates). This provides a natural fiber reinforced mortar;
(d) Calcium oxide (5% to 15% by weight), which together with the presence of $Al_2O_3$, forms Al-tobermorite (C-A-S-H, calcium-alumino-silicate hydrates) when mixed with pozzolanic ash;
(e) Alkali metal oxides ($Na_2O$ and $K_2O$, 5% to 15% by weight). Alkalis are important as they serve the dual purpose of (1) speeding up the hydration process of the C-A-S-H and (2) favoring chemical cross-linking, which leads to the formation of polymeric phases. In current clinkers, the presence of alkalis is ensured through the pyroprocessing of clay-rich rocks, which are added to the raw material. The presence of alkali metal oxides within a naturally blended CaO and $Al_2O_3$ mix also ensures the formation of geopolymers when the clinker is slaked under alkaline conditions and temperature as low as $80°$ C. By having approximately as much alkali metal oxides ($Na_2O$ and $K_2O$) as CaO, together with the presence of $Al_2O_3$, this blend has the capability of producing a clinker that is, by its nature, hydraulic.

An important aspect of this raw meal is what's not in it—carbon-containing chemical species in the raw meal are less than 1% by weight, and are preferably as close to 0% by weight as possible.

To produce the Phlego cement one part of this new clinker can be mixed with two parts of pozzolanic ash, either from natural origin or industrial byproducts (e.g. volcanic or fly ashes). Each lump of the clinker phase being dispersed within the pozzolan will then constitute a functional and structural unit of the cement. When slaked, each lump of clinker forms fibrous ettringite (C-S-A-H, calcium-sulfo-aluminate hydrates), creating a cluster of intertwined fibers being dispersed within the pozzolanic ash and branching out to the surrounding areas. This forms a natural fiber reinforced material. Due to the presence of alkali metal oxides ($Na_2O$ and $K_2O$) and CaO, both in the clinker and pozzolanic ash, fibrous ettringite will result embedded in a crossbred matrix made of a geopolymer and C-A-S-H (C-A-S-H, calcium-alumino-silicate hydrates).

Besides the environmental benefit of cutting down on $CO_2$ emissions, the impact of this cement is on expanded durability, improved physico-chemical resilience, and serviceability. The most notable impact is on applications that require absorption of strain energy and/or stability in harsh environments. These applications include (1) concrete that must perform in areas experiencing seismic ground shaking and (2) cement sheath between wellbore casing that is exposed to injection of $CO_2$, acid fluids injected for fracking, or re-injection of wastewater from fracking, which pose risks to water resources, (3) encapsulation of industrial waste and (4) planetary shelters and habitats of tomorrow.

D) Reduced Carbon Emission

Figure 3:
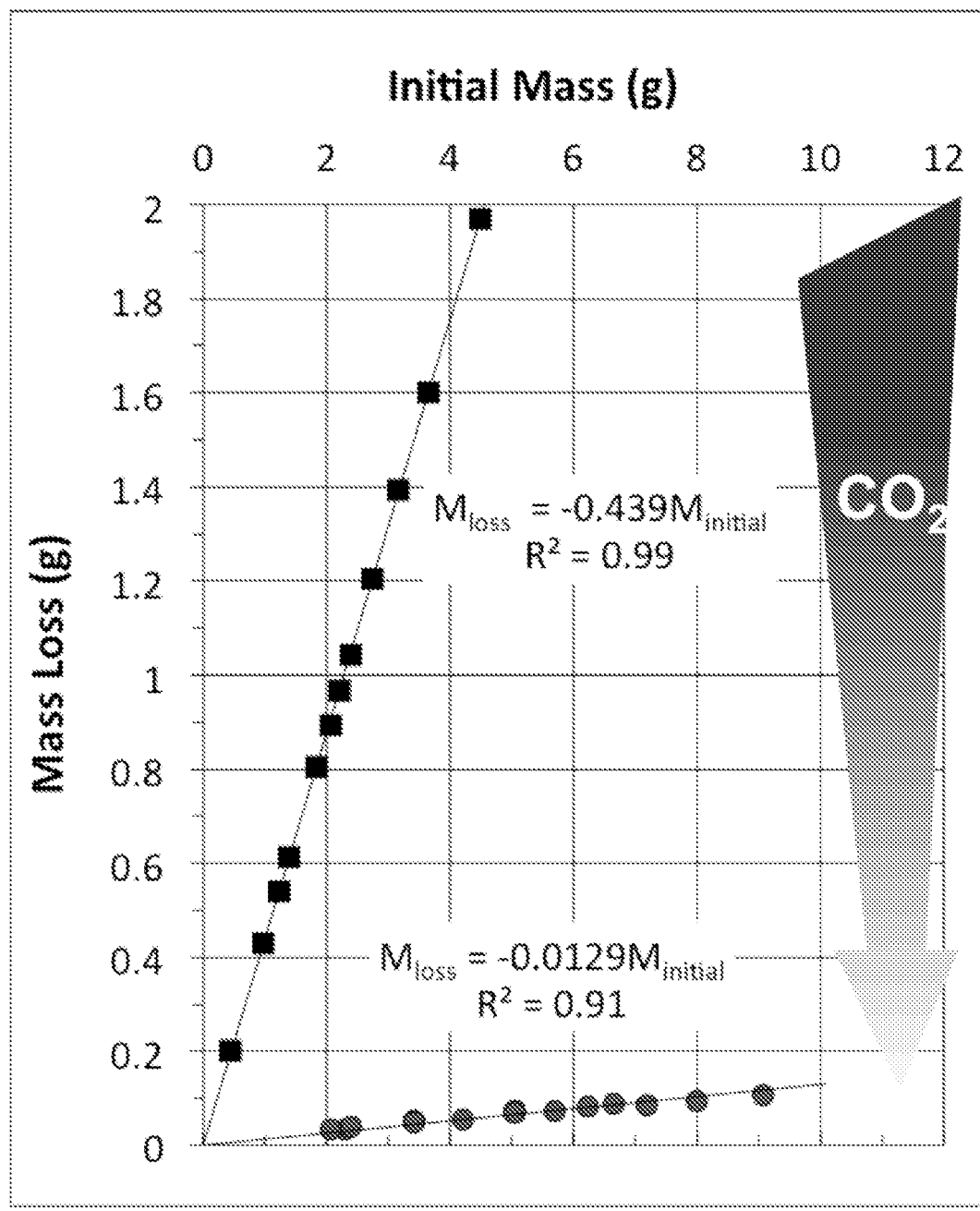
FIG. 3 shows decreased carbon emission according to principles of this work.

FIG. 3 shows mass loss from heating at 900° C. (pyroprocessing) both limestone and the new binder precursor. The mass loss from limestone (squares) is stoichiometric (43.9%, the slope of the fitting trend), and corresponds to the mass of $CO_2$ emitted upon the calcination of $CaCO_3$. The new binder precursor (circles) is carbon-free compared to limestone, suggesting a huge saving in $CO_2$ emissions during thermal decomposition.

E) Examples of Growth of Fibers Via Hydrothermal Synthesis

Figure 4A:
FIGS. 4A-B are SEM images of exemplary growth of fibrous minerals made via hydrothermal synthesis.
Figure 4B:
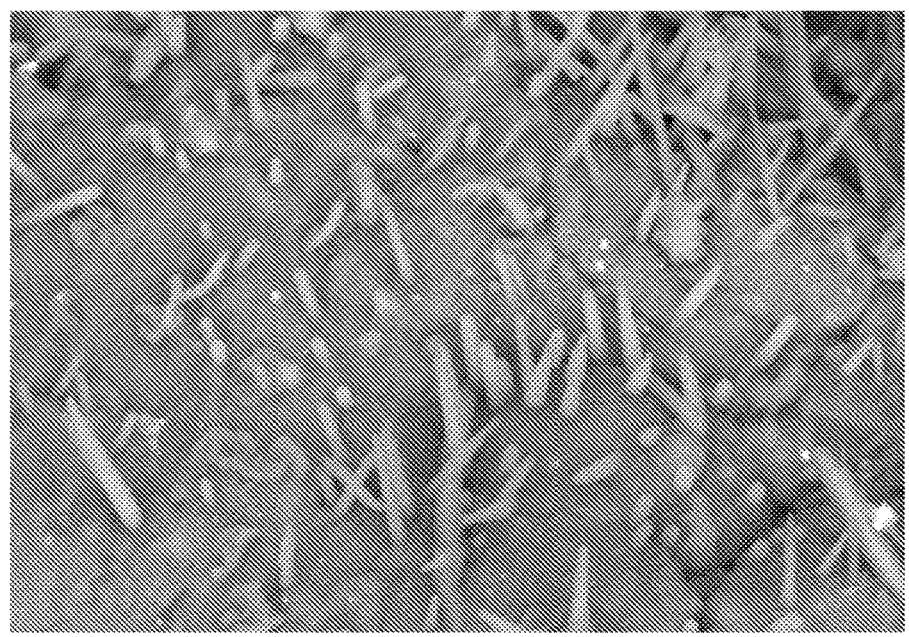

FIGS. 4A-B are images showing examples of growth of fibers through hydrothermal synthesis (Head et al., 2018). Promoting the growth of fibrous minerals internally to the binder through the use of both an alkali-calcic clinker composition (as described above) in conjunction with a synthesis that mimics natural hydrothermal systems (~80-100° C.) is uniquely advantageous as it (a) eliminates the problem of adding fibers to a material, which increases the viscosity of the cement and (b) makes fibers to blend-in the mortar, both chemically and mechanically. The former avoids problems related to workability of the slurry; the latter promotes the bonding process at the matrix-fiber interface.

The invention claimed is:

1. A method of making a clinker for use in cement production, the method comprising:
    providing raw meal including silica, aluminum oxide, alkali oxides, calcium oxide and sulfur oxide;
    wherein a weight fraction of silica in the raw meal is between 40% and 60%;
    wherein a weight fraction of the aluminum oxide in the raw meal is between 10% and 25%;
    wherein a weight fraction of the alkali metal oxides in the raw meal is between 5% and 15%;
    wherein a weight fraction of the calcium oxide in the raw meal is between 5% and 15%;
    wherein a weight fraction of the sulfur oxide in the raw meal is between 0.5% and 2%;
    wherein a weight fraction of carbon-containing chemical species in the raw meal is less than 1%;
    firing the raw meal to provide the clinker.

2. The method of claim 1, wherein the firing the raw meal to provide the clinker is performed in a temperature range from 900° C. to 1200° C.

3. A method of forming concrete, the method comprising:
    performing the method of claim 1 to provide a clinker;
    slaking the clinker to provide a slurry;
    curing the slurry in a temperature range from 80° C. to 100° C. to promote the growth of fibrous minerals.

* * * * *